Dec. 27, 1932.  E. WIST  1,892,325

MEANS FOR CONVERTING THE ELECTRIC ARC INTO AN ELONGATED FLAME

Original Filed March 28, 1929

Inventor:
Engelbert Wist

Patented Dec. 27, 1932

1,892,325

UNITED STATES PATENT OFFICE

ENGELBERT WIST, OF VIENNA, AUSTRIA

MEANS FOR CONVERTING THE ELECTRIC ARC INTO AN ELONGATED FLAME

Original application filed March 28, 1929, Serial No. 350,582, and in Austria February 26, 1929. Divided and this application filed February 25, 1930. Serial No. 431,227.

This application is a division of application Serial No. 350,582, filed March 28th, 1929.

The present invention relates to a method and device for increasing the energy of the electric arc and extending it into a flame which is particularly suitable for welding and heating but also for chemical and metallurgical purposes.

The invention consists essentially in forming the arc between concentric electrodes one of which is composed of carbon and the other of metal and in a space charged with a gaseous hydro-carbon compound, the object being to maintain the carbon electrode intact by the resulting carbon deposition. The welding flame is formed by passing a blast of air or gas across the arc from between the electrodes so as to extend the arc, and the above-mentioned gaseous hydro-carbon compound may be employed for this purpose. Other features of the invention relate to devices whereby the method is carried out. The gas mixture containing the hydro-carbon compound is decomposed by the electric arc, and the carbon or graphite is deposited on the carbon electrode so as to keep the latter renewed. Besides, the decomposition of the gas mixture has the effect of rendering the flame chemically neutral so that a perfect welding joint will be obtained. In order to prevent an excessive deposition of carbon on the carbon electrode, a hydro-carbon compound containing oxygen is preferably employed.

The gas employed may consist of a mixture of coal gas and hydrogen or steam, or an alcohol compound, for instance ethyl or methyl alcohol with or without water.

It has been found that the stability of the welding flame produced in the above-described manner will be still further enhanced if the inner surface of the outer electrode, whether this is composed of the pipe itself or of a separate nozzle, is arcuated or conically flared. Finally it has been found that the gas blast will issue at a constant pressure if the liquid whence it is derived is throttled and lead through a heating coil which is heated by the flame, to delivery nozzles arranged symmetrically in an annular row and in a great number about the central electrode.

Figure 1:
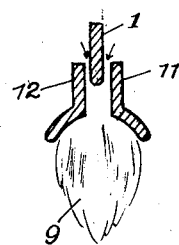
Figure 2:
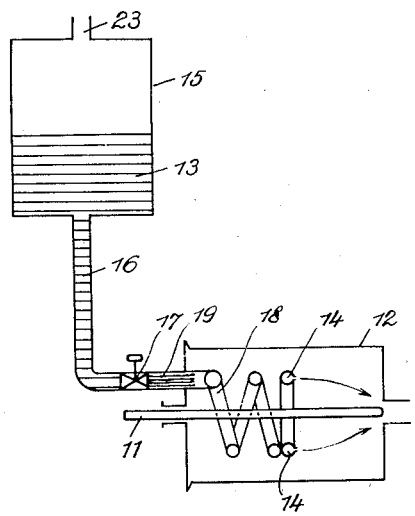
Figure 3:
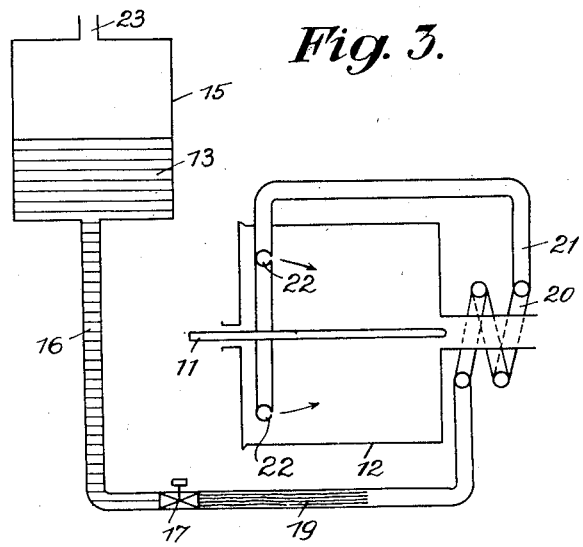

In the accompanying drawing a device whereby the method may be carried out is illustrated by way of example, Fig. 1 representing a view of a suitable electrode, Fig. 2 is a view of a device for supplying the gas blast, and Fig. 3, a view of the modification of said device.

The rod-shaped electrode 1 is, as shown in Fig. 1, arranged within the outer electrode 12 in the above-described manner. The lower part of the outer electrode is according to the invention formed with an arcuate, preferably conical, inner surface. By this arrangement the welding flame 9, elongated by the air or gas blast, will maintain a constant, conically pointed flame.

The gas blast is produced by the evaporation of a liquid which is for this purpose heated by means of an apparatus illustrated in Figs. 2 and 3.

According to Fig. 2 the liquid 13 is contained in a tank 15 having at the bottom a discharge pipe 16. The latter is continued by a heating coil 18. The connecting pipe between the pipe 16 and the coil 18 is provided with a throttle valve 17. The electrodes 11 and 12 are concentric and so arranged that the front end of the outer electrode 12 projects beyond the inner electrode 11. The heating coil 18 is arranged inside the outer electrode and surrounds the inner one. The coil terminates in several nozzles 14 which form a ring around the central electrode. The front pipe between the valve 17 and the heating coil 18 contains throttling means 19, for instance in the form of fine parallel pipes, cotton wool, asbestos, wire gauze or the like. By this arrangement the gas produced by the evaporation of the liquid 13 (alcohol or the like), will issue from the nozzles 14 at a constant pressure, and the welding flame, which is extended by the gas, will also remain constant in shape.

The arrangement illustrated in Fig. 3 differs from that of Fig. 2 in that the discharge pipe 16 opens into a heating coil 20 which, instead of being arranged inside the outer electrode, is arranged outside the electrode 12, or rather about the projecting end of the same and communicates through a pipe 21 with the discharge nozzles 22 arranged inside the electrode 12. The tank containing the liquid is provided with air vents 23.

I claim:—

1. A device for forming an elongated electric arc comprising an electrode of metal, a second electrode of carbon, one of the electrodes being of rod shape, the other electrode being tubular and disposed in concentric spaced relation to the rod-shaped electrode, means for forming an electric arc between the electrodes, and means for directing a blast of gaseous hydrocarbon longitudinally of the rod-shaped electrode and confined by the tubular electrode, with the blast passing across the arc for the elongation of the latter in the direction of the blast, the gaseous hydrocarbon serving to renew the carbon electrode without affecting the metal electrode.

2. A device for forming an elongated electric arc comprising an electrode of metal, a second electrode of carbon, one of the electrodes being of rod shape, the other electrode being tubular and disposed in concentric spaced relation to the rod-shaped electrode, means for forming an electric arc between the electrodes, and means for directing a blast of gaseous hydrocarbon longitudinally of the rod-shaped electrode and confined by the tubular electrode, with the blast passing across the arc for the elongation of the latter in the direction of the blast, the projection of the arc beyond the arcing point being confined by one of the electrodes to definitely define the shape of the flame projection resulting from the passage of the gaseous compound through and across the arc, the gaseous hydrocarbon serving to renew the carbon electrode without affecting the metal electrode.

ENGELBERT WIST.